US012305446B2

(12) United States Patent
Poikonen et al.

(10) Patent No.: US 12,305,446 B2
(45) Date of Patent: May 20, 2025

(54) POWERED DOOR SYSTEM

(71) Applicant: Dynatect Manufacturing, Inc., New Berlin, WI (US)

(72) Inventors: Bradley J. Poikonen, Waukesha, WI (US); Steven B. Piacsek, Waukesha, WI (US)

(73) Assignee: Dynatect Manufacturing, Inc., New Berlin, WI (US)

( * ) Notice: Subject to any disclaimer, the term of this patent is extended or adjusted under 35 U.S.C. 154(b) by 361 days.

(21) Appl. No.: 17/816,474

(22) Filed: Aug. 1, 2022

(65) Prior Publication Data

US 2023/0417097 A1 Dec. 28, 2023

Related U.S. Application Data

(60) Provisional application No. 63/366,857, filed on Jun. 23, 2022.

(51) Int. Cl.

*E06B 9/74* (2006.01)
*E05F 15/668* (2015.01)
*E06B 9/72* (2006.01)

(52) U.S. Cl.

CPC .............. *E06B 9/74* (2013.01); *E05F 15/668* (2015.01); *E05Y 2201/22* (2013.01); (Continued)

(58) Field of Classification Search

CPC ..... E06B 9/72; E06B 9/74; E06B 9/80; E06B 2009/801; E06B 2009/802; E06B 9/13; E05F 15/668

See application file for complete search history.

(56) References Cited

U.S. PATENT DOCUMENTS 2,019,084 A * 10/1935 Miller ........................ E06B 9/60 160/133
4,664,170 A * 5/1987 Labelle ...................... E06B 9/78 160/133

(Continued)

FOREIGN PATENT DOCUMENTS

CN 201018345 2/2008
CN 2010018345 Y * 2/2008

(Continued)

OTHER PUBLICATIONS

Extended European Search Report for corresponding European Patent Application No. 22190443.6 dated Nov. 8, 2023.

*Primary Examiner* — Johnnie A. Shablack
*Assistant Examiner* — Matthew R. Shepherd
(74) *Attorney, Agent, or Firm* — James A. Joyce; Godfrey & Kahn, S.C.

(57) ABSTRACT

A door operator including a drive motor having a motor housing and a drive shaft selectively rotatable via electric power, a drive tube for receiving therein the drive motor, wherein the motor housing is secured to the drive tube to prevent rotation therebetween. The door operator further including a first side plate and second side plate with the drive tube rotatably supported therebetween, at least one drive cog secured to the drive tube, wherein the drive cog is engageable with a door to provide translation of the door. The door operator further including a locking gear secured to the drive shaft, a locking plate slidingly coupled to the first side plate, including a gear engagement portion, and a locking lever secured to the locking plate and operational to selectively disengage the gear engagement portion of the locking plate, allowing the locking gear to be rotatable with the motor housing.

14 Claims, 9 Drawing Sheets

(52) U.S. Cl.
CPC ..... *E05Y 2201/626* (2013.01); *E05Y 2201/68* (2013.01); *E05Y 2201/688* (2013.01); *E05Y 2201/71* (2013.01); *E05Y 2900/132* (2013.01); *E06B 9/72* (2013.01)

(56) References Cited

U.S. PATENT DOCUMENTS

| | | | | | |
|---|---|---|---|---|---|
| 5,040,843 | A | | 8/1991 | Russell et al. | |
| 5,246,054 | A | * | 9/1993 | Shepherd | E06B 9/86 160/133 |
| 5,355,927 | A | * | 10/1994 | McKeon | E06B 9/82 160/310 |
| 5,540,269 | A | | 7/1996 | Plumer | |
| 5,611,386 | A | * | 3/1997 | Wang | A47H 5/0325 160/331 |
| 5,706,552 | A | * | 1/1998 | Hsieh | E06B 9/84 16/DIG. 10 |
| 5,711,360 | A | * | 1/1998 | Viotte | E06B 9/74 160/310 |
| 6,085,825 | A | | 7/2000 | Swink et al. | |
| 6,244,325 | B1 | * | 6/2001 | Miller | E06B 9/62 160/310 |
| 6,422,965 | B1 | * | 7/2002 | Balli | E06B 9/74 160/310 |
| 6,427,749 | B1 | | 8/2002 | Swink et al. | |
| 8,397,787 | B1 | * | 3/2013 | Daus | E05F 15/71 160/1 |
| 10,829,989 | B2 | | 11/2020 | Rejc | |
| 11,220,858 | B2 | * | 1/2022 | Clements | E06B 9/322 |
| 2013/0099714 | A1 | * | 4/2013 | Mullet | E06B 9/68 318/468 |
| 2013/0126107 | A1 | * | 5/2013 | Feldstein | E06B 9/70 160/310 |
| 2013/0180673 | A1 | | 7/2013 | Hashimshony et al. | |
| 2016/0115731 | A1 | * | 4/2016 | Pfaff | E06B 9/58 160/271 |
| 2016/0374497 | A1 | * | 12/2016 | McCarthy | H01M 50/213 160/310 |
| 2019/0085632 | A1 | * | 3/2019 | Smith | E06B 9/88 |
| 2020/0173231 | A1 | * | 6/2020 | Drifka | E06B 9/13 |

FOREIGN PATENT DOCUMENTS

| | | | | | |
|---|---|---|---|---|---|
| DE | 102007053531 | | | 5/2009 | |
| EP | 2131003 | A2 | * | 12/2009 | E05D 13/1223 |
| EP | 2131003 | B1 | | 8/2015 | |
| JP | 2022-035682 | A2 | | 3/2022 | |

* cited by examiner

POWERED DOOR SYSTEM

CROSS REFERENCE TO RELATED APPLICATION

This application claims the benefit of U.S. Provisional Patent Application Ser. No. 63/366,857 filed Jun. 23, 2022, which is incorporated herein by reference in its entirety for all purposes.

FIELD OF THE INVENTION

The invention relates generally to powered doors and more particularly to powered door systems

BACKGROUND OF THE INVENTION

The use of powered rolling doors is common. Such powered rolling doors can be found in vehicles, such as delivery/transport vehicles to allow for loading and unloading materials, as well as receiving/distribution docks. Generally known systems for operating a powered door include a selectively operated motor positioned a distance from a shaft and coupled therewith via a gear, belt, chain, etc. The shaft can include a plurality of gears that engage the door. Actuation of the motor then causes the shaft and gears to rotate raising or lowering the door. Current configurations suffer from numerous drawbacks that make installation and use problematic.

BRIEF SUMMARY OF THE INVENTION

In at least some embodiments, the invention relates to a door operator for securement adjacent a door opening, the door operator comprising: a drive motor having a motor housing and a drive shaft selectively rotatable via electric power; a drive tube for receiving longitudinally therein the drive motor, wherein the motor housing is secured to the drive tube to prevent rotation therebetween; a first side plate and a second side plate with the drive tube rotatably supported therebetween; at least one drive cog secured to the drive tube, wherein the at least one drive cog is engageable with a door such that rotation of the drive tube provides translation of the door to at least one of an open position and a closed position; a locking gear secured to the drive shaft; a locking plate slidingly coupled to the first side plate, including a gear engagement portion; and a locking lever secured to the locking plate and operational to selectively disengage the gear engagement portion of the locking plate with the locking gear, thereby allowing the locking gear to be rotatable with the motor housing.

In at least some other embodiments, the invention relates to a powered door system comprising: a door; a spring-loaded roller interconnected to the door and having a pair of roller end plates; drive motor having a motor housing and a drive shaft selectively rotatable via electric power; a drive tube for receiving the drive motor longitudinally therein, wherein the motor housing is secured to the drive tube to prevent rotation therebetween, the drive tube including a central longitudinal axis, wherein the drive motor is longitudinally centered along the central longitudinal axis and in line with the drive tube; a first side plate and a second side plate with the drive tube rotatably supported therebetween; at least one drive cog secured to the drive tube, wherein the at least one drive cog is engageable with the door such that rotation of the drive tube provides translation of the door to at least one of an open position and a closed position; a locking gear secured to the drive shaft; a locking plate slidingly coupled to the first side plate, including a gear engagement portion; and a locking lever secured to the locking plate and operational to selectively disengage the gear engagement portion of the locking plate with the locking gear, thereby allowing the locking gear to be rotatable with the motor housing.

Other embodiments, aspects, and features of the invention will be understood and appreciated upon a full reading of the detailed description and the claims that follow.

BRIEF DESCRIPTION OF THE DRAWINGS

Embodiments of the invention are disclosed with reference to the accompanying drawings and are for illustrative purposes only. The invention is not limited in its application to the details of construction or the arrangement of the components illustrated in the drawings. The invention is capable of other embodiments or of being practiced or carried out in other various ways.

DETAILED DESCRIPTION

Figure 1:
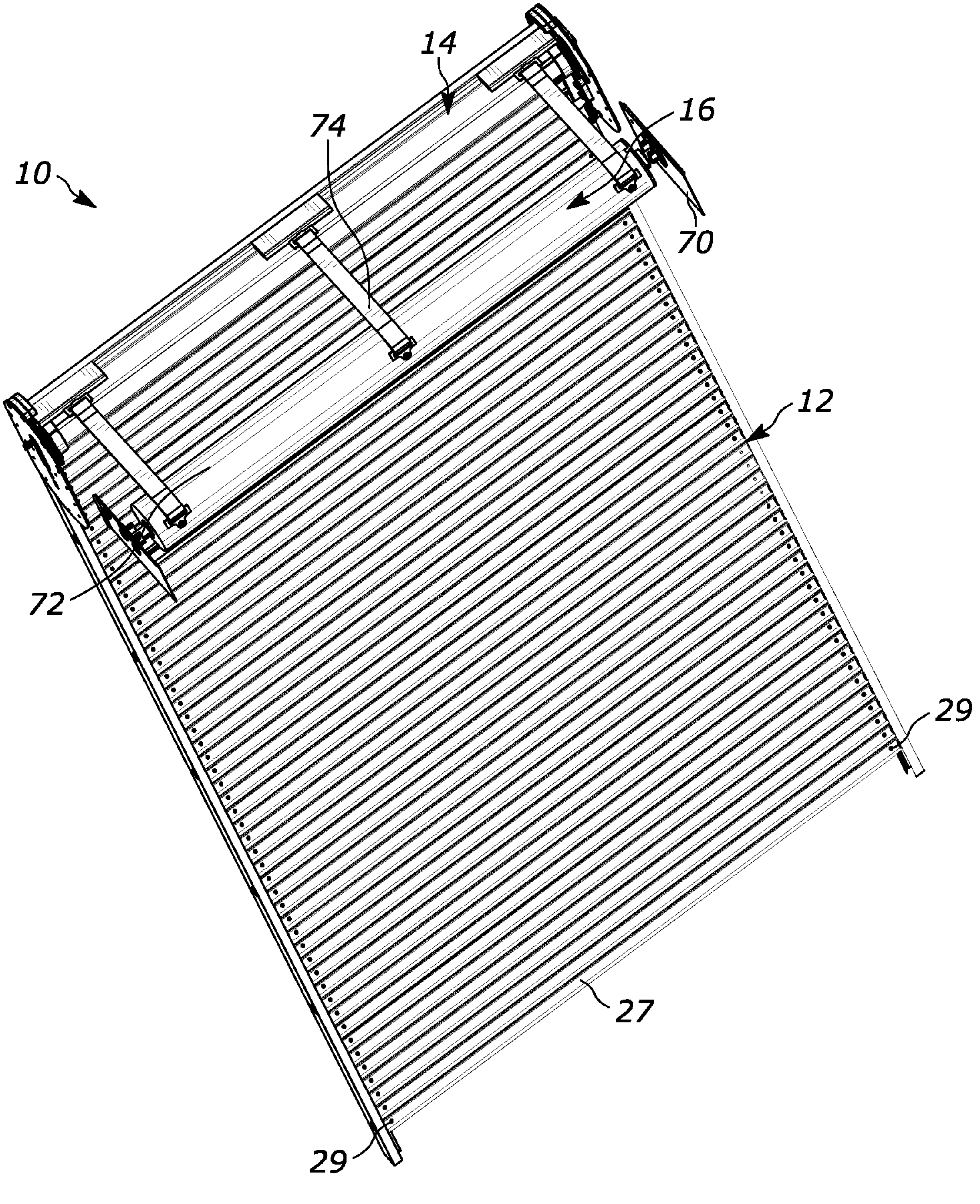
FIG. 1 illustrates a rear top perspective view of an exemplary powered door system comprising a door operator, a door, and a spring-loaded roller.
Figure 2:
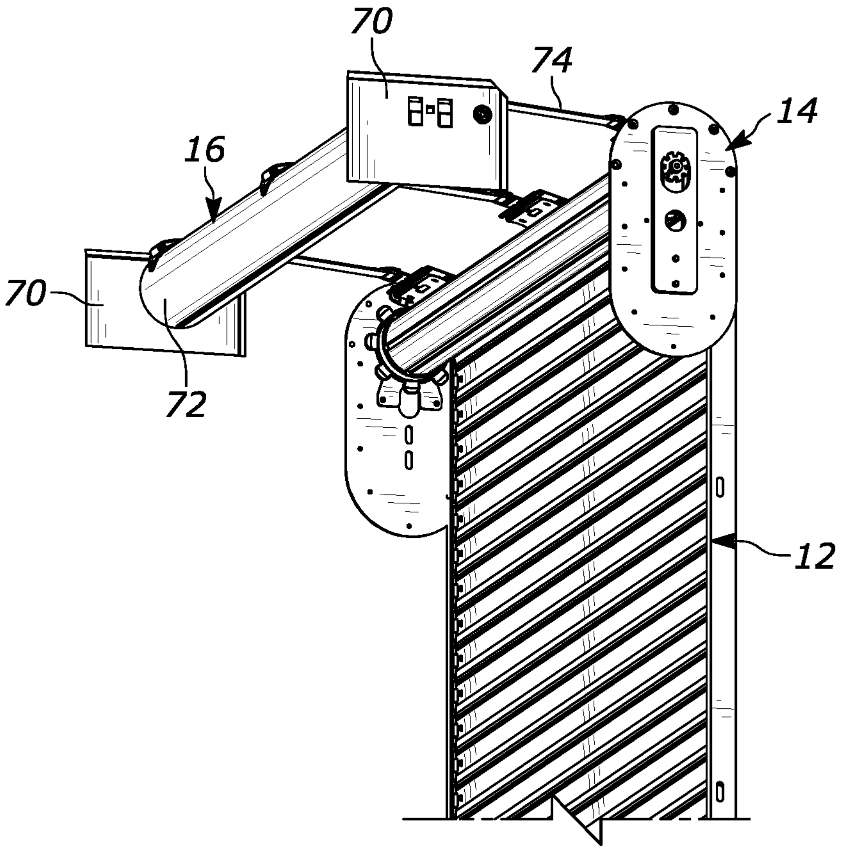
FIG. 2 illustrates a rear bottom perspective view of the powered door system of FIG. 1.
Figure 3:
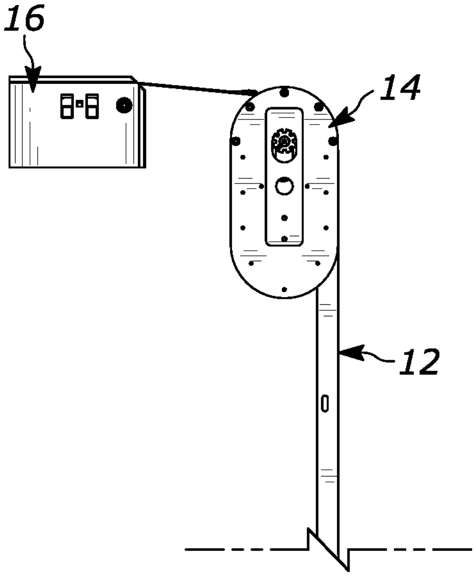
FIG. 3 illustrates a side perspective view of the powered door system of FIG. 1.

FIGS. 1-3 illustrate various views of an exemplary powered door system 10 that includes a door 12 (e.g., a roll-up sectional door), a door operator 14, and an assist roller 16. The door operator 14 is configured to be installed and fixed in place about a door opening (not shown) and coupled to the door 12 as discussed below. The door 12 provides a moveable barrier for the door opening. The assist roller 16 is secured adjacent to the door operator 14 and coupled to the door 12 to assist with opening the door. The assist roller 16 is a known component and can include any of various other types of roller assemblies used to provide a force to assist with opening a door, such as a spring-loaded roller, and therefore shall not be limited to any specific type of roller assembly.

Referring to FIGS. 4-12, various exemplary perspective, side, exploded, and cross-sectional views of the door operator 14 are provided. In at least some embodiments, the door operator 14 includes an electric drive motor 18 having a motor housing 20, and a drive shaft 22 that is selectively rotatable in a first and second direction via electric power.

The drive motor 18 can be chosen from various types of motors, such as a brushless DC motor, with the size and horsepower chosen to match a desired application based on door size and/or weight, etc. The motor housing 20 encloses various typical components found in a motor such as a stator, rotor, etc., and electrically energizing the drive motor 18 causes an unencumbered drive shaft 22 to rotate relative to the motor housing 20.

The door operator 14 also includes a drive tube 24 for receiving therein the drive motor 18, wherein the motor housing 20 is secured to the drive tube 24 to prevent rotation therebetween, and the drive tube 24 is sized to accordingly receive the drive motor 18 longitudinally. The drive tube 24 includes a central longitudinal axis 25 (see FIG. 8), wherein in at least some embodiments, the drive motor 18 and its drive shaft 22 are longitudinally centered along the central longitudinal axis 25 and in line with the drive tube 24, such that they are all rotatable about the central longitudinal axis 25.

The door operator 14 is configured to engage and translate (i.e., move) the door 12 via a coupling of the drive tube 24 with the door 12. In at least some embodiments, this is accomplished by a first cog 26 and a second cog 28 secured to the drive tube 24, where the first cog 26 and second cog 28 include radially extending perimeter cog teeth 23 for engagement with vertical portions of the door 12 (e.g., door ribs 27, door cog apertures 29, etc.) such that selective rotation of the drive tube 24 provides translation of the door 12 between an open position and a closed position, and vice-versa. In at least some embodiments, the cogs 26, 28 are generally circular to slide over the drive tube 24 and further include a plurality of inside cog ribs 30 that protruding radially inward to engage a plurality of drive tube grooves 32 extending longitudinally along the drive tube 24, this configuration allows the cogs 26, 28 to be slid on/off the drive tube 24 for installation and removal, while preventing rotation therewith. Other cog, door, drive tube engagement configurations can be utilized to engage the drive tube 24 with the door 12.

In at least some embodiments, first and second end caps 36, 38 are provided that are inserted into the drive tube 24 at opposing ends, wherein the second end cap 38 can include a passage for power wiring 40 to be passed through to the drive motor 18. The door operator 14 further includes first and second side plates 42, 44 interconnected with the drive tube for mounting the drive tube to a structure, such as a wall or support adjacent a door opening. The door operator also can include first and second idler plates 46, 48, having first and second apertures 50, 52. The first aperture supports a portion of the drive shaft 22 via a bearing 54 resting in the first aperture 50, wherein the first aperture is sized (e.g., height, length, width, etc.) to allow the drive shaft 22 to be displaced upwards during disengagement, as discussed below. The second aperture 52 receives and supports an idler shaft 56 secured to the second end cap 38, wherein in at least some embodiments, the idler shaft 56 can be integrally formed or otherwise fixed to the second idler plate 48 without the need for the second aperture 52. The idler plates 46, 48 are secured respectively to the side plates 42, 44. A plurality of arc-shaped door drive guides 58 can be secured to the side plates 42, 44 to guide the door 12 and assist with keeping the door 12 engaged with the cog teeth 23.

The door operator 14 further includes a locking gear 60 radially secured to the drive shaft 22 to prevent rotation therebetween. A locking plate 62 is also provided that is slidingly coupled to the first side plate 42, and includes a gear engagement portion 61, wherein the gear engagement portion 61 engages the locking gear 60 to fix the locking gear 60 and the interconnected drive shaft 22 in place relative to the first side plate 42 (and therefore relative to the door opening). In at least some embodiments, the locking gear 60 can include radially extending locking teeth 73 for engaging gear engagement teeth 75 of the gear engagement portion 61, while in other embodiments, the gear engagement portion 61 and locking gear 60 can utilize any one of various other engagement configurations, including but not limited to friction, pins, etc.

Figure 10:
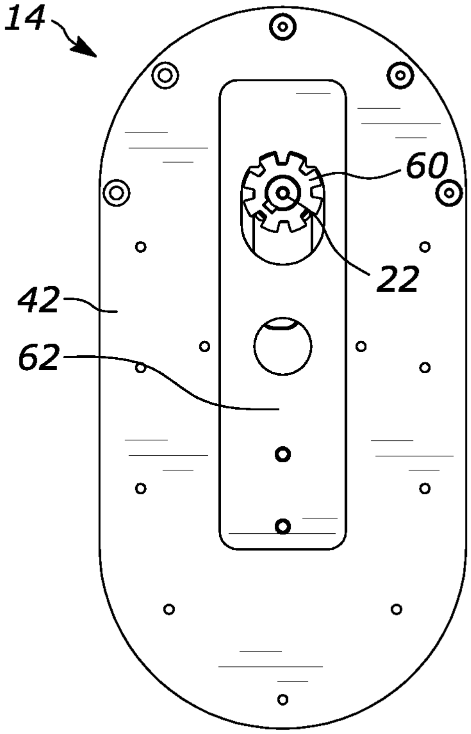
FIG. 10 illustrates a first side view of the door operator of FIG. 4 in an engaged position.
Figure 11:
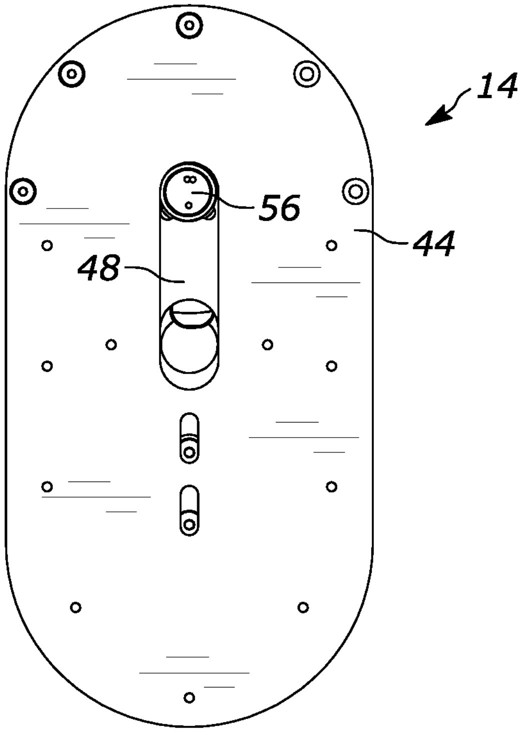
FIG. 11 illustrates a second side view of the door operator of FIG. 4 in an engaged position.
Figure 12:
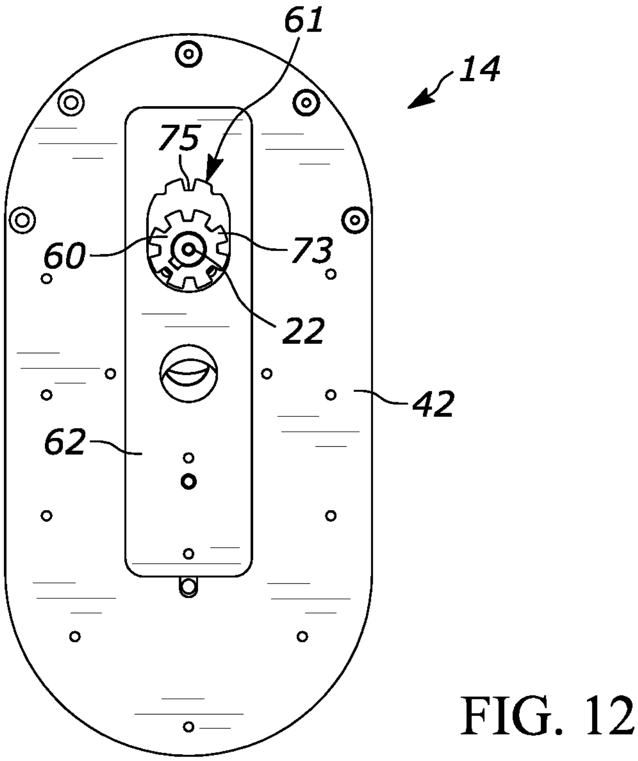
FIG. 12 illustrates a first side view of the door operator of FIG. 4 in a disengaged position.

The locking plate 62 is slidably translatable relative to the first side plate 42. In at least some embodiments, the locking plate 62 is moveable via a locking lever 63 that can be actuated to disengage the gear engagement portion 61 from the locking gear 60. This disengagement position can be seen in FIG. 12. The locking plate 62 can typically rest in an engaged position as seen in FIG. 10. The locking lever 63 can take various forms that are functional to disengage the locking plate 62 from the locking gear 60. In at least some embodiments, the locking lever 63 includes a slide plate 65 coupled to the locking plate 62 via a plurality of fasteners 57, with the first side plate 42 situated therebetween. The first side plate 42 can include a plurality of slots 59 (e.g., vertical slots) for receiving the fasteners 57 therethrough and allowing the fasteners 57, slide plate 65, and locking plate 62 to be jointly moved upwards to disengage the locking plate 62 from the locking gear 60. In at least some embodiments, the locking lever 63 is manually controlled via a handle 67 that can be grasped by a user, and can further include a biasing element, such as a spring 69 coupled between the slide plate 65 and a lower portion of the slide plate 65, such as protrusion 71 to keep the locking plate 62 biased downward and in engagement with the locking gear 60 for motor powered door opening and closing. In at least some embodiments, the locking plate 62 can be accessed and operated remotely from outside the front of the door 12 when the door is in a closed position.

Figure 4:
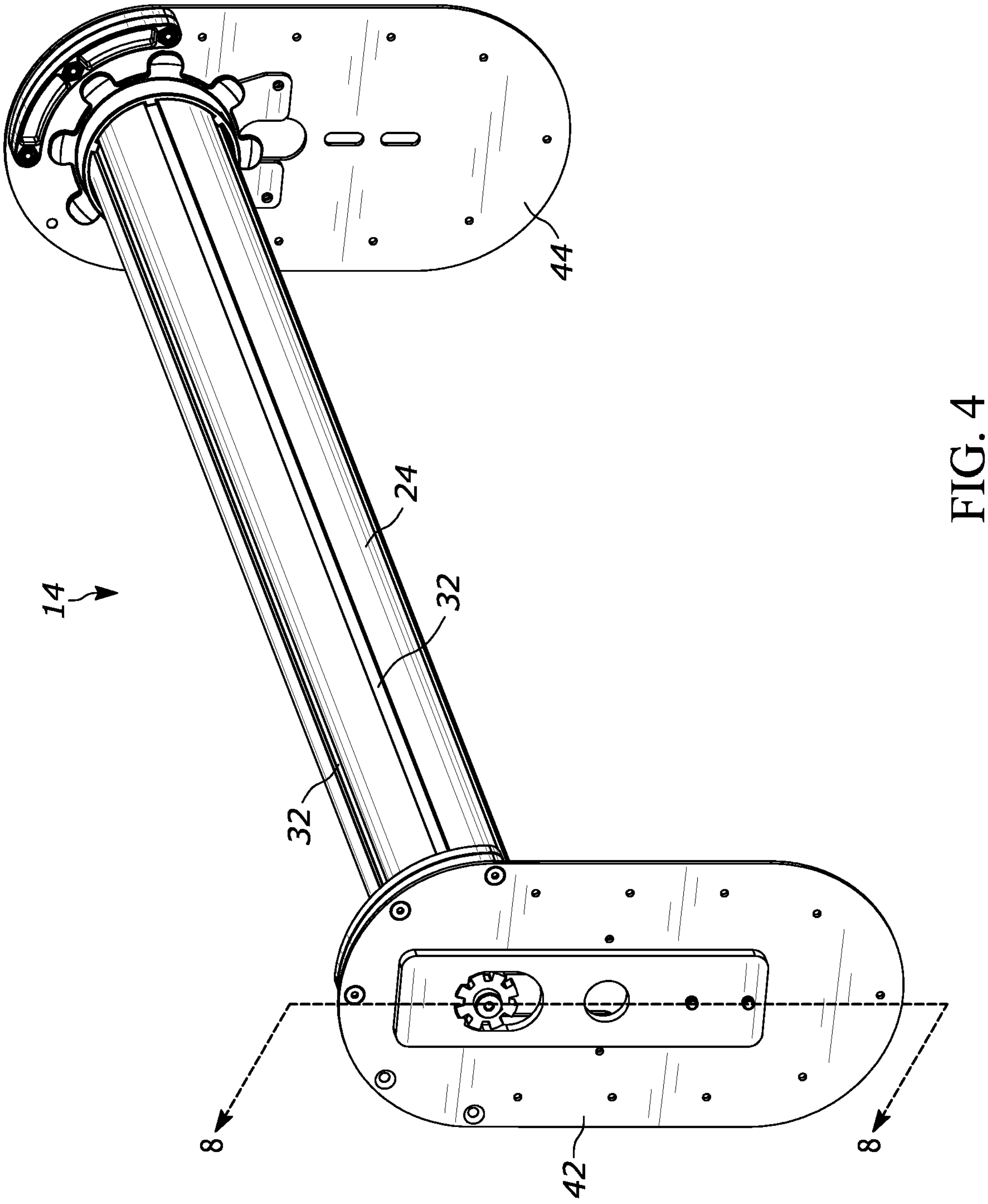
FIG. 4 illustrates a front perspective view of the exemplary door operator of the powered door system of FIG. 1.
Figure 5:
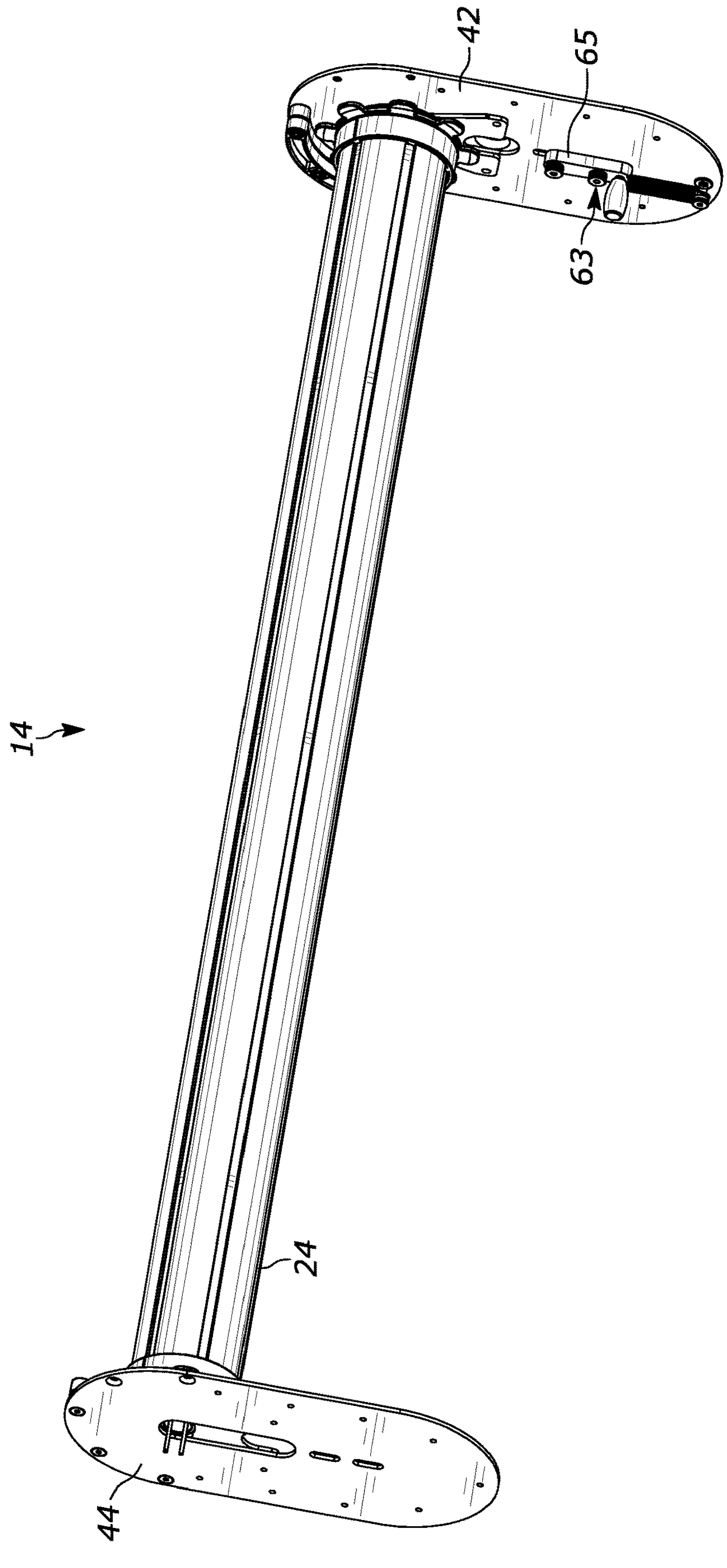
FIG. 5 illustrates a rear perspective view of the door operator of the powered door system of FIG. 1.
Figure 6:
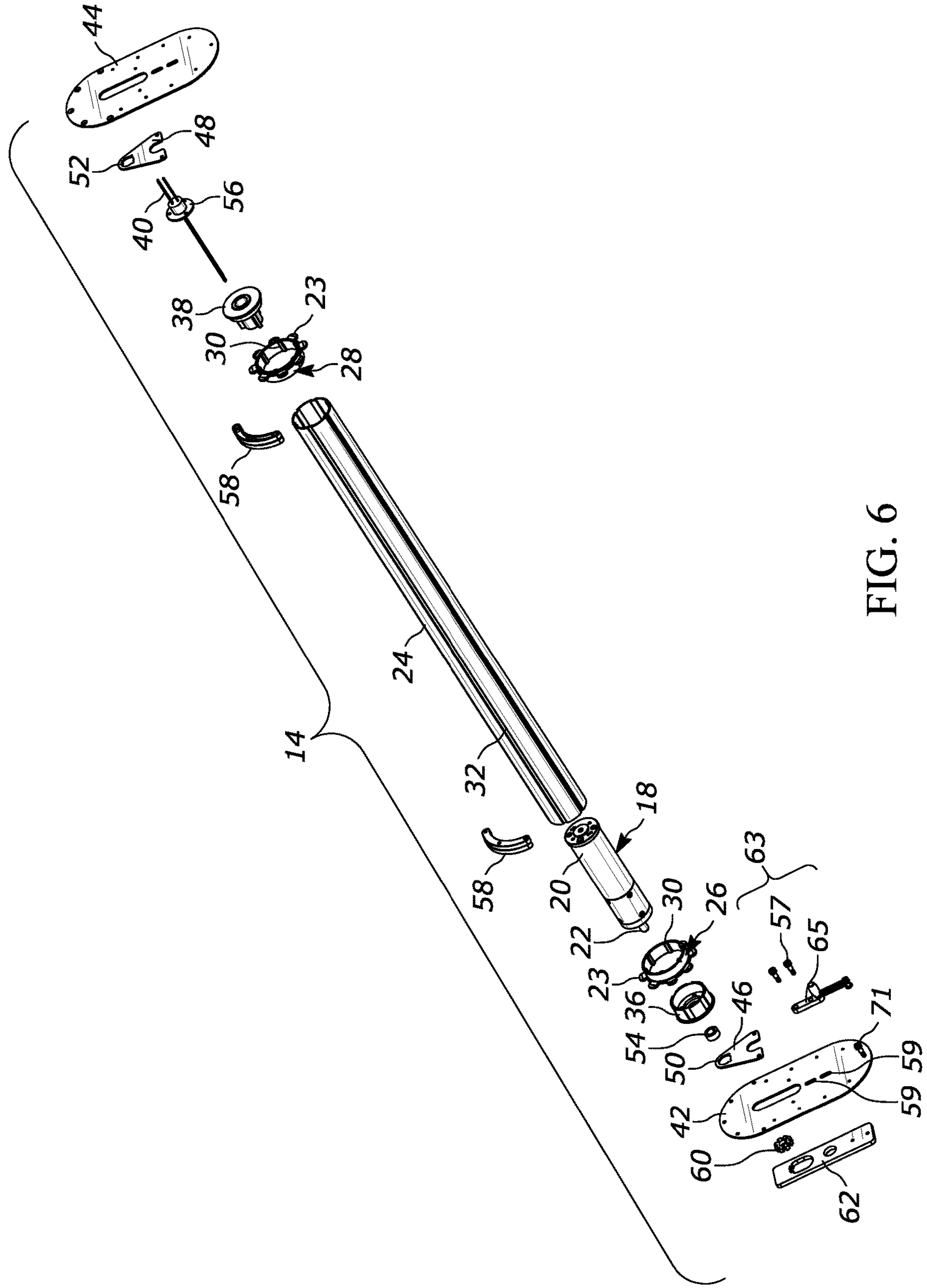
FIG. 6 illustrates an exploded perspective view of the door operator of FIG. 4.
Figure 7:
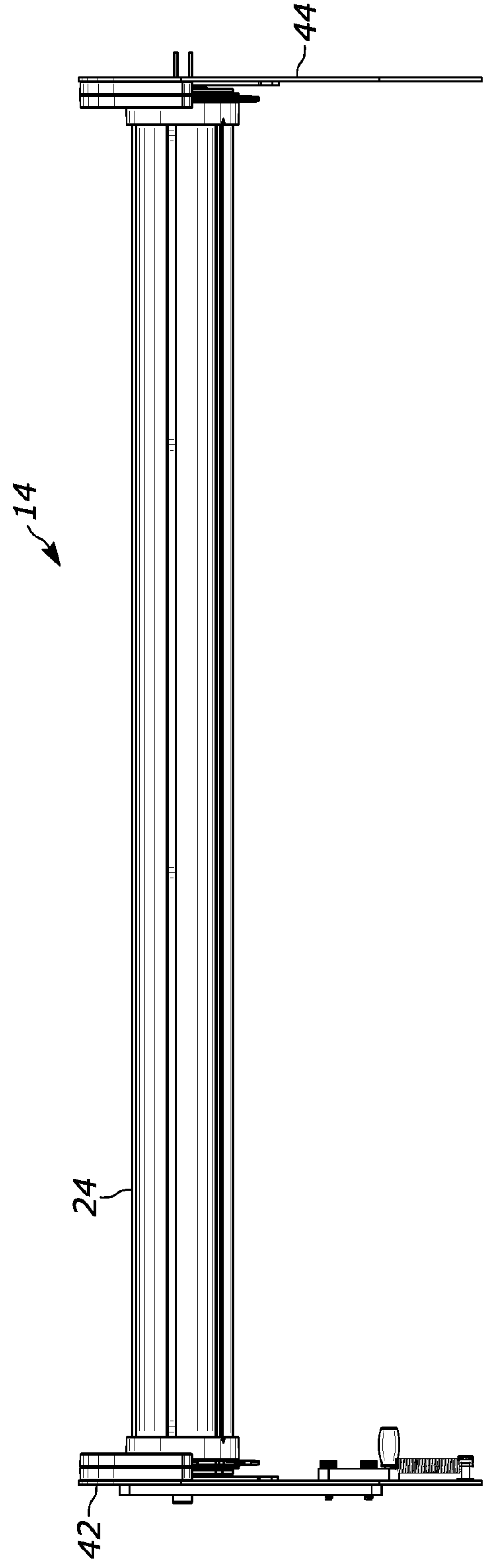
FIG. 7 illustrates a front view of door operator of FIG. 4.
Figure 8:
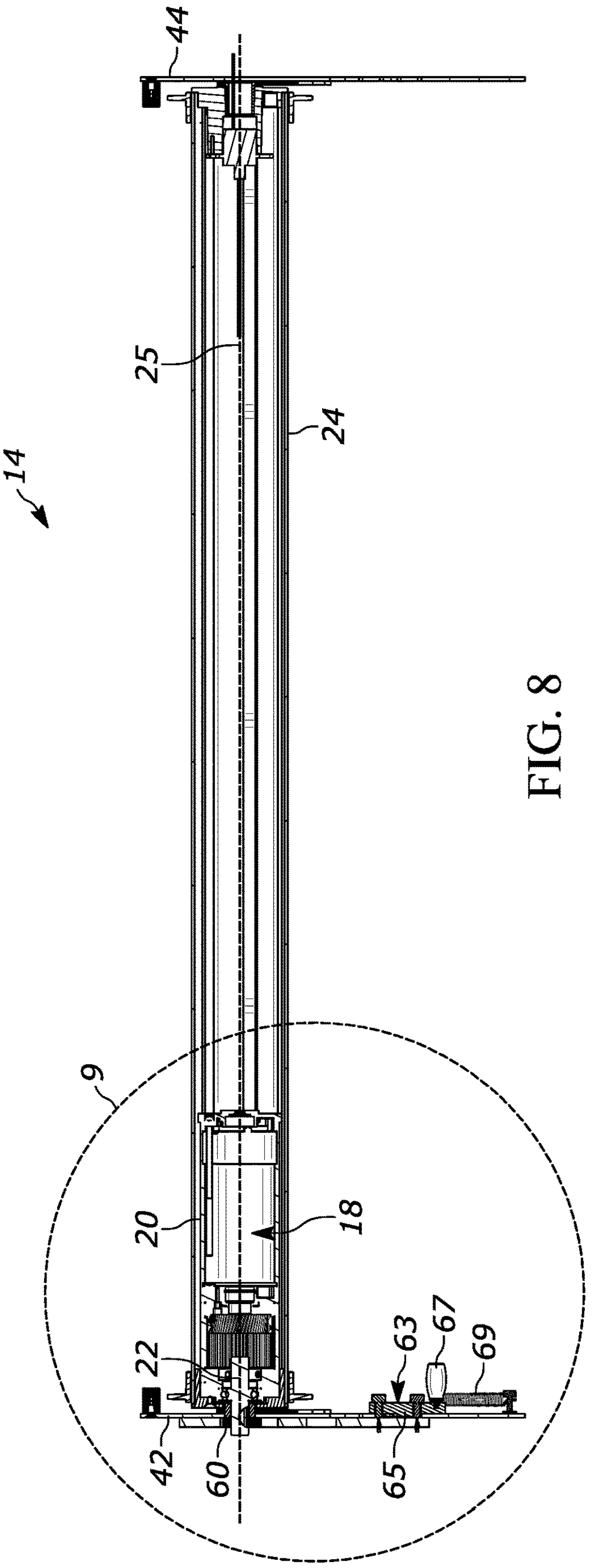
FIG. 8 illustrates a front sectional view of the door operator taken along line 8-8 of FIG. 4.
Figure 9:
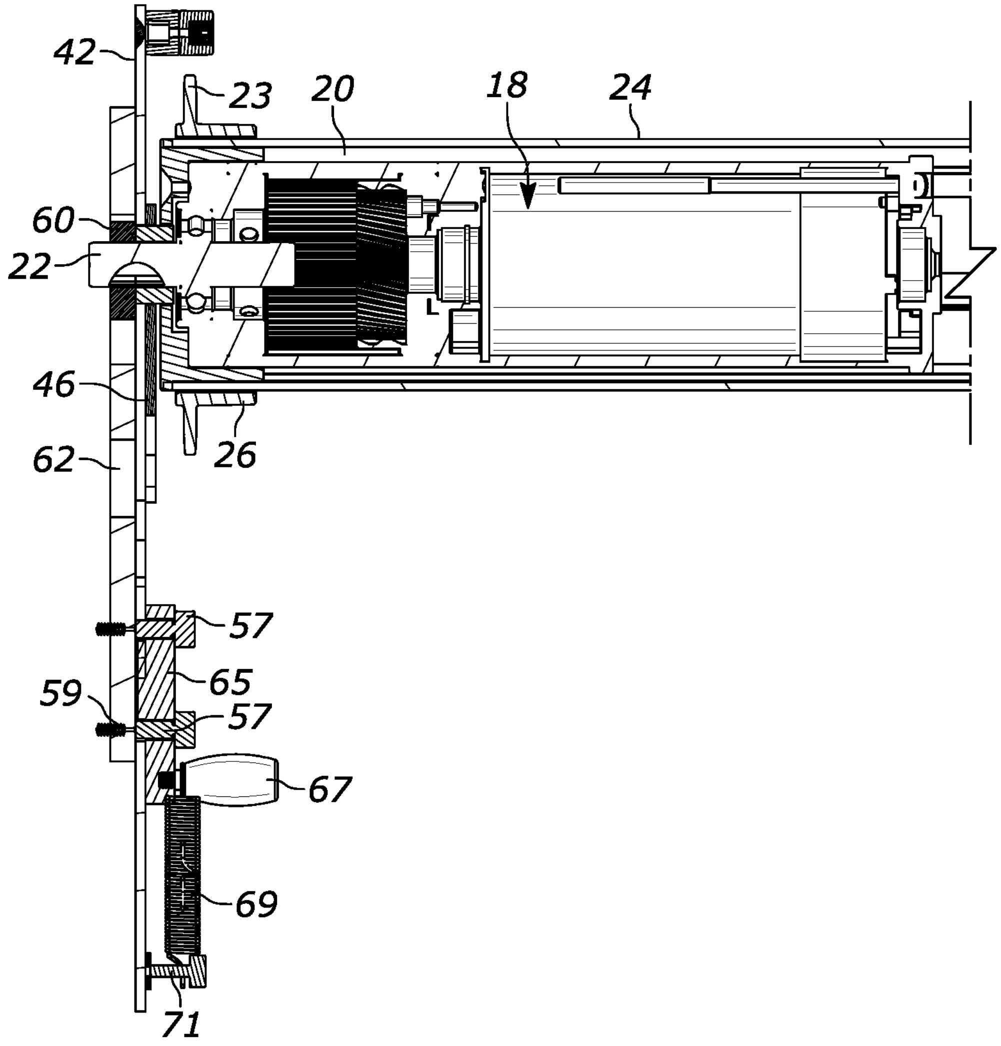
FIG. 9 illustrates a close-up partial sectional view of the door operator taken along line 9 of FIG. 8.

As the first and second side plates 42, 44 are fixed to a door opening during installation of the powered door system 10, when the locking plate 62 is in the engaged position (e.g., down position), such as shown in FIGS. 4, 8, and 10, the locking gear 60 and secured drive shaft 22 are rotationally fixed relative to the first side plate 42 by the locking plate 62, and therefore the motor housing 20 of the drive motor 18 is forced to rotate when the drive motor 18 is energized. Since the motor housing 20 is secured to the drive tube 24, which is secured to the first and second cogs 26, 28, which are coupled with the door 12, rotation of the motor housing 20 about the central longitudinal axis 25 of the drive tube 24 causes the door 12 to be translated up or down depending on the direction initiated by a user (via the motor control buttons). In contrast, when the locking plate 62 is raised to the disengaged position (e.g., up position) the locking gear 60 and drive shaft 22 are no longer rotationally fixed relative to the first side plate 42 and therefore are free to rotate with the motor housing 20 coupled to the drive tube 24 and cogs 26, 28, thereby allowing a user to manually raise or lower the door 12 without powering the drive motor or having to counter the motor's internal resistance.

To effectuate the selective powering of the drive motor 18, any one of various door controllers can be utilized, which in at least some embodiments, can include discreet or integrated power relays for connecting a power source with the motor (e.g., DC positive and negative conductors that can be switched to provide forward or reversing rotation), safety sensors for preventing closure or reversing the door 12 if an obstacle is sensed, operator actuatable close/open/stop buttons, etc. In at least some embodiments such components can be interconnected with a microprocessor-based controller.

The door operator 14 can be used with or without the assist roller 16, as the assist roller can be unnecessary depending on the door size, location, and weight. Although shown in one exemplary form in FIGS. 1-3, the assist roller 16 can include any of various known assist rollers that can be coupled to the door 12. The exemplary assist roller 16 seen in FIGS. 1-3, includes a pair of roller end plates 70 that are fixed in place to provide support for a rotatable roller tube 72 suspended therebetween, wherein the roller tube 72 includes an internal spring (not shown) and wherein the roller tube 72 is coupled to the door 12 via a plurality of roller straps 74. The internal spring is wound when the door is closed so as to impart a door opening (lifting) bias force to assist the initial movement of the door 12 when opening, thereby reducing the start-up power load on the drive motor 18.

Further, the powered door system 10 can utilize any of various types of doors, with or without minor modifications to be engaged with the drive tube 24, one exemplary door can be a Gortite™ Aluminum Roll-Up Door, as manufactured by Dynatect Manufacturing of New Berlin Wisconsin.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of any appended claims and the description of the invention herein. For example, more less cogs of the same or different shapes can be used, the gear engagement portion and locking gear can take many forms while still providing the locking engagement function, etc. It shall be understood that the phrase "a plurality" shall include one or more.

We claim:

1. A door operator for securement adjacent a door opening, the door operator comprising:
- a drive motor having a motor housing and a drive shaft selectively rotatable via electric power;
- a drive tube for receiving longitudinally therein the drive motor, wherein the drive tube includes a central longitudinal axis and the drive motor is longitudinally centered along the central longitudinal axis and in line with the drive tube, and wherein the motor housing is secured to the drive tube to prevent rotation therebetween;
- a first side plate and a second side plate with the drive tube rotatably supported therebetween;
- a first cog and a second cog, wherein the first cog and the second cog each include radially extending perimeter cog teeth and the drive tube further includes a plurality of drive tube grooves extending longitudinally, and wherein the first cog and the second cog are circular and include a plurality of inside cog ribs that protrude radially inward, and wherein the plurality of inside cog ribs are slidingly received within the plurality of drive tube grooves to secure the first and the second cogs to the drive tube and prevent rotation between the drive tube and both the first cog and the second cog, wherein the first cog and the second cog are engageable with a door such that rotation of the drive tube provides translation of the door to at least one of an open position and a closed position;
- a locking gear secured to the drive shaft;
- a locking plate slidingly coupled to the first side plate, including a gear engagement portion; and
- a locking lever secured to the locking plate and operational to selectively disengage the gear engagement portion of the locking plate with the locking gear, thereby allowing the locking gear to be rotatable with the motor housing, wherein the locking lever further comprises a slide plate, wherein the slide plate is secured to the locking plate via a plurality of fasteners, and the first side plate further includes a plurality of slots for receiving the plurality of fasteners therethrough, and wherein the plurality of fasteners are vertically translatable within the slots.

2. The door operator of claim 1, wherein engagement of the gear engagement portion with the locking gear causes the drive tube to rotate independent relative to the drive shaft when the motor is electrically powered, and wherein disengagement of the gear engagement portion with the locking gear prevents the drive tube from rotating when the motor is electrically powered.

3. The door operator of claim 1, further comprising a plurality of arc-shaped door drive guides secured to the first side plate and second side plate.

4. A door operator for securement adjacent a door opening, the door operator comprising:
- a drive motor having a motor housing and a drive shaft selectively rotatable via electric power;
- a drive tube for receiving longitudinally therein the drive motor, wherein the motor housing is secured to the drive tube to prevent rotation therebetween;
- a first side plate and a second side plate with the drive tube rotatably supported therebetween;
- at least one drive cog secured to the drive tube, wherein the at least one drive cog is engageable with a door such that rotation of the drive tube provides translation of the door to at least one of an open position and a closed position;
- a locking gear secured to the drive shaft;
- a locking plate slidingly coupled to the first side plate, including a gear engagement portion; and
- a locking lever secured to the locking plate and operational to selectively disengage the gear engagement portion of the locking plate with the locking gear, thereby allowing the locking gear to be rotatable with the motor housing, wherein the locking lever further comprises a slide plate, wherein the slide plate is secured to the locking plate via a plurality of fasteners, and the first side plate further includes a plurality of slots for receiving the plurality of fasteners therethrough, and wherein the plurality of fasteners are vertically translatable within the slots.

5. The door operator of claim 4, wherein the locking lever is manually actuatable via a handle and further includes a biasing element coupled to the slide plate to keep the locking plate biased downward and in engagement with the locking gear.

6. The door operator of claim 5, wherein the gear engagement portion includes gear engagement teeth and the locking gear includes radially extending locking teeth for engaging with the gear engagement teeth.

7. The door operator of claim 6, further comprising a first end cap and a second end cap inserted into the drive tube at opposing ends, wherein the second end cap includes a passage for power wiring to be passed through to the drive motor.

8. The door operator of claim 7, further comprising a first idler plate having a first aperture and a second idler plate, wherein the first idler plate and second idler plate are secured respectively to the first side plate and second side plate, and wherein the first aperture of the first idler plate supports the drive shaft.

9. A powered door system comprising:

a door;

an assist roller interconnected to the door and having a pair of roller end plates;

a drive motor having a motor housing and a drive shaft selectively rotatable via electric power;

a drive tube for receiving the drive motor longitudinally therein, wherein the motor housing is secured to the drive tube to prevent rotation therebetween, the drive tube including a central longitudinal axis, wherein the drive motor is longitudinally centered along the central longitudinal axis and in line with the drive tube;

a first side plate and a second side plate with the drive tube rotatably supported therebetween;

at least one drive cog secured to the drive tube, wherein the at least one drive cog is engageable with the door such that rotation of the drive tube provides translation of the door to at least one of an open position and a closed position;

a locking gear secured to the drive shaft;

a locking plate slidingly coupled to the first side plate, including a gear engagement portion; and a locking lever secured to the locking plate and operational to selectively disengage the gear engagement portion of the locking plate with the locking gear, thereby allowing the locking gear to be rotatable with the motor housing, wherein the locking lever further comprises: a slide plate, wherein the slide plate is secured to the locking plate via a plurality of fasteners extending through a plurality of slots in the first side plate, wherein the plurality of fasteners are vertically translatable within the slots; and a biasing element coupled to the slide plate to keep the locking plate in a downward biased position in engagement with the locking gear.

10. The powered door system of claim 9, wherein the at least one drive cog includes a first cog and a second cog secured to the drive tube, wherein the first cog and the second cog each include radially extending perimeter cog teeth.

11. The powered door system of claim 10, wherein the door is a roll-up door comprising a plurality of vertically interconnected ribs, wherein at least one of the ribs or a plurality of apertures spaced along the door provide for mating engagement with the perimeter cog teeth.

12. A door operator for securement adjacent a door opening, the door operator comprising:

a drive motor having a motor housing and a drive shaft selectively rotatable via electric power;

a drive tube for receiving longitudinally therein the drive motor, wherein the motor housing is secured to the drive tube to prevent rotation therebetween;

a first side plate and a second side plate with the drive tube rotatably supported therebetween;

at least one drive cog secured to the drive tube, wherein the at least one drive cog is engaged with a roll-up door having a plurality of vertically interconnected ribs, such that rotation of the drive tube provides translation of the door to at least one of an open position and a closed position;

a locking gear secured to the drive shaft;

a locking plate slidingly coupled to the first side plate, including a gear engagement portion; and a locking lever interconnected with the locking plate and operational to selectively disengage the gear engagement portion of the locking plate from the locking gear, thereby allowing the locking gear and drive shaft to rotate both relative to the first side plate and coincident with the motor housing, wherein the locking lever further comprises a slide plate, and wherein the slide plate is secured to the locking plate via a plurality of fasteners to allow for a vertical movement of the slide plate and locking plate relative to the side plate.

13. The door operator of claim 12, wherein the locking gear is situated over the drive shaft to extend radially therefrom.

14. The door operator of claim 12, wherein the locking lever is manually actuatable by a user via a handle, and is biased via a spring to maintain engagement of the gear engagement portion of the locking plate with the locking gear.

* * * * *